Jan. 24, 1961     D. M. KYLLONEN     2,969,274
CYCLIC PROCESS FOR PRODUCTION OF SODIUM BOROHYDRIDE
Filed June 9, 1955
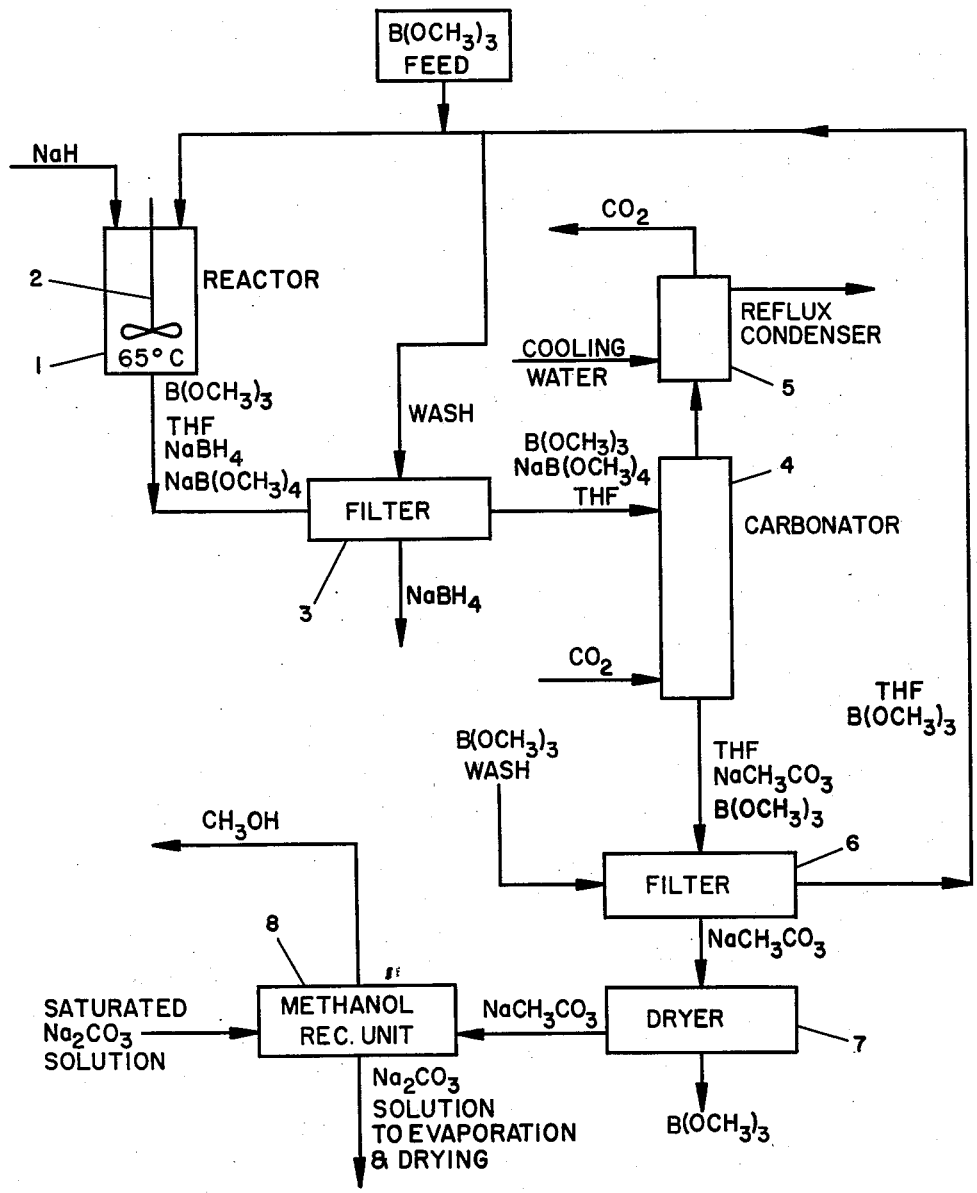
CYCLIC PROCESS FOR PREPARATION
OF SODIUM BOROHYDRIDE
David M. Kyllonen
INVENTOR.
BY Neal J. Mosely
his Attorney United States Patent Office 2,969,274
Patented Jan. 24, 1961

2,969,274

CYCLIC PROCESS FOR PRODUCTION OF SODIUM BOROHYDRIDE

David M. Kyllonen, Pittsburgh, Pa., assignor to Callery Chemical Company, Pittsburgh, Pa., a corporation of Pennsylvania Filed June 9, 1955, Ser. No. 514,249

8 Claims. (Cl. 23—14)

This invention relates to new and useful improvements in methods for producing sodium borohydride and more particularly to a cyclic process for producing sodium borohydride by reaction of sodium hydride and methyl borate in tetrahydrofuran together with a treatment of the by-product sodium tetramethoxyborate to recover methyl borate therefrom for further reaction with sodium hydride.

Sodium borohydride ($NaBH_4$) is a relatively new compound which has become commercially available in recent years. Sodium borohydride has become important as a selective reducing agent and as an intermediate in the preparation of diborane and other boron containing compounds. Several methods for preparing sodium borohydride have been developed and reported in the literature and in prior patents by H. I. Schlesinger and H. C. Brown. In Schlesinger et al., Patents 2,461,661, 2,461,662 and 2,461,663, the preparation of sodium borohydride was described by reaction of diborane, $B_2H_6$, with sodium trimethoxyborohydride, $NaBH(OCH_3)_3$, sodium methoxide, $NaOCH_3$, or sodium tetramethoxyborate, $NaB(OCH_3)_4$. Still later in Schlesinger et al. 2,534,533 the preparation of sodium borohydride was reported by the reaction: $4NaH + B(OCH_3)_3 \rightarrow NaBH_4 + 3NaOCH_3$. This reaction, it should be noted, requires the use of a 4 to 1 molar ratio of sodium hydride to trimethylborate and further requires the use of temperatures above 200° C. and preferably of about 275 to 300° C. In the copending application of Schlesinger and Brown, Serial Number 513,164, filed June 3, 1955, there is reported the preparation of sodium borohydride by the reaction of sodium hydride and trimethyl borate in tetrahydrofuran at the reflux temperature of tetrahydrofuran. In this process a large amount of the methyl borate is lost in the form of the by-product sodium tetramethoxyborate. In the co-pending application of Adams and Schechter, Serial Number 463,584, filed October 20, 1954, now Patent No. 2,937,195, there is described a process for recovery of trimethyl borate from sodium tetramethoxyborate by reaction of the latter compound with carbon dioxide. In that process carbon dioxide is reacted with sodium tetramethoxyborate to produce trimethyl borate and a by-product compound sodium methyl carbonate, $NaCH_3CO_3$, which is hydrolyzed to produce sodium carbonate and methanol.

It is one object of this invention to provide a new and improved cyclic process for preparing sodium borohydride from sodium hydride and trimethylborate at relatively low temperatures in tetrahydrofuran in which part of the trimethylborate is recovered from the by-product sodium tetramethoxyborate and recycled for further reaction with sodium hydride. Other objects of this invention will become apparent from time to time throughout the specification and claims as hereinafter related.

In the accompanying drawing there is shown a flow diagram illustrating my new and improved cyclic process for preparation of sodium borohydride.

This invention is based upon the discovery that sodium hydride and trimethylborate may be reacted at a relatively low temperature to produce sodium borohydride and sodium tetramethoxyborate and that trimethyl borate may be recovered from the by-product sodium tetramethoxyborate, all in the medium tetrahydrofuran.

In the initial steps of this process sodium hydride and a mixture of trimethyl borate and tetrahydrofuran (THF) are fed into a reactor 1 which is provided with an agitator or stirrer 2 to provide intimate mixing of reactants. The mixture in the reactor 1 is maintained at the reflux temperature of tetrahydrofuran or about 65° C. The reaction is preferably carried out using a stoichiometric excess of trimethylborate. In fact when a molar ratio of trimethylborate to sodium hydride of about 7.5 to 1 is used the reaction goes substantially to completion, with about 95% yields, in less than one hour. The process can be operated continuously by using a continuous feed of both of the reactants through the reactor at a rate providing a residence time giving maximum yield. During the reaction which takes place in the reactor 1 sodium borohydride is formed in better than 90% yields together with a by-product sodium tetramethoxyborate. Sodium tetramethoxyborate is quite soluble in tetrahydrofuran and remains in solution. Sodium borohydride, however, is insoluble in tetrahydrofuran and precipitates in the reaction mixture. The material leaving the reactor 1 therefore consists of a slurry of sodium borohydride and unreacted sodium hydride in a solution of trimethyl borate and sodium tetramethoxyborate in tetrahydrofuran. This slurry of reaction products and solvent is passed into a filter 3 where the sodium borohydride (and unreacted sodium hydride) is separated from the trimethyl borate, tetrahydrofuran and dissolved tetramethoxyborate. The sodium borohydride which is recovered at the filter 3 is a material of very high purity. However, the sodium borohydride may be further purified by extraction with liquid ammonia to separate the sodium borohydride from the small residue of unreacted sodium hydride. The filtrate from the filter 3, which consists of a mixture of tetrahydrofuran, trimethylborate and dissolved tetramethoxyborate, is passed to the top of a reaction tower or carbonator 4. The carbonator 4 is provided with a suitable inlet for introducing carbon dioxide at the bottom of the tower to mix intimately with and to react with the sodium tetramethoxyborate in solution which is passing downward y through the tower. The carbonator 4 is equipped with a reflux condenser 5 for recovering all of the trimethylborate and tetrahydrofuran which might otherwise be carried out with the stream of gaseous carbon dioxide. In the carbonator tower 4 the carbon dioxide reacts with the sodium tetramethoxyborate to displace trimethylborate therefrom and to form sodium methyl carbonate ($NaCH_3CO_3$). The trimethyl borate which is displaced from the sodium tetramethoxyborate remains in solution in the tetrahydrofuran while the sodium methyl carbonate which is formed is precipitated in the form of very finely divided crystals. The reaction mixture which leaves the bottom of the carbonator consists of a slurry of sodium methyl carbonate in a mixture of tetrahydrofuran and trimethylborate. This reaction slurry is passed into a filter 6 where the sodium methyl carbonate is removed and the solution of tetrahydrofuran and trimethylborate is returned to the reactor 1 for further reaction with sodium hydride to prepare more sodium borohydride. Trimethylborate in a quantity sufficient to replace that lost in the formation of the sodium borohydride is added to the mixture of tetrahydrofuran and trimethylborate at the point indicated as trimethylborate feed. The filters 3 and 6, it should be noted, are each provided with connections for circulating a wash fluid through the filtered solids if desired. The sodium methyl carbonate which is removed from the filter 6 is fed into a drier 7 where it is heated to remove all of the methyl borate and solvent therefrom. The dried sodium methyl carbonate crystals are then passed into a methanol recovery unit or hydrolysis reactor 8. In the methanol recovery unit 8 the sodium methyl carbonate is hydrolyzed to produce sodium carbonate and methanol. The sodium methyl carbonate is preferably hydrolyzed using a saturated aqueous solution of sodium carbonate so that the sodium carbonate which forms upon hydrolysis remains as solid crystals rather than being dissolved in the water. The methanol which is produced upon hydrolysis of the sodium methyl carbonate is removed from the methanol recovery unit 8 and recycled for further reaction with boric oxide, boric acid, or borax for preparation of additional trimethylborate for use in this process.

It should be noted that in the reaction which forms the first step of this process in which sodium hydride and trimethylborate are reacted to form sodium borohydride and sodium tetramethoxyborate approximately three-fourths of the trimethylborate is lost in the form of sodium tetramethoxyborate. This reaction is $$4NaH + 4B(OCH_3)_3 \rightarrow NaBH_4 + 3NaB(OCH_3)_4$$

In this process by integrating the formation of sodium borohydride and sodium tetramethoxyborate in tetrahydrofuran with the recovery and recycling of trimethylborate by reaction of the solution of sodium tetramethoxyborate in tetrahydrofuran with carbon dioxide it is possible to produce a cyclic process in which all of the boron values and all of the methanol is readily recoverable. The overall reaction or material balance for this integrated cyclic process can be expressed as follows:

$$8NaH + 2B(OCH_3)_3 + 3CO_2 + 3H_2O \rightarrow 2NaBH_4 + 3Na_2CO_3 + 6CH_3OH$$

It is apparent from the material balance for this process that the use of a completely cyclic process of this invention permits the complete conversion of sodium hydride to sodium borohydride at relatively low temperatures without loss of trimethylborate in the form of the by-product sodium tetramethoxyborate.

While there has been described in this specification only one modification of this invention it will be obvious to those skilled in the art that within the scope of the appended claims this invention may be practiced otherwise than as specifically described.

Having thus described my invention what I desire to claim and secure by Letters Patent of the United States is:

1. A cyclic process for preparation of sodium borohydride, $NaBH_4$, which comprises contacting sodium hydride, $NaH$, and trimethylborate, $B(OCH_3)_3$, in tetrahydrofuran, $C_2H_8O$, to produce a solution of sodium tetramethoxyborate, $NaB(OCH_3)_4$, in tetrahydrofuran and a precipitate of sodium borohydride, separating the sodium borohydride from said solution, contacting the filtrate from said separation with carbon dioxide to produce a solution of trimethyl borate in tetrahydrofuran and a precipitate of sodium methyl carbonate, $NaCH_3CO_3$, separating the sodium methyl carbonate from said trimethyl borate and tetrahydrofuran, and recycling said trimethyl borate and tetrahydrofuran for further reaction with sodium hydride.

2. A method according to claim 1 in which a substantial stoichiometric excess of trimethylborate is used.

3. A method according to claim 1 in which the solution of sodium tetramethoxyborate is contacted with carbon dioxide at the reflux temperature of tetrahydrofuran.

4. A method according to claim 1 in which the sodium methyl carbonate is hydrolyzed to produce sodium carbonate and methanol, and the methanol is recycled for preparation of more trimethylborate.

5. A method according to claim 4 in which the sodium methyl carbonate is hydrolyzed with a saturated aqueous solution of sodium carbonate.

6. A cyclic process for preparation of sodium borohydride which comprises continuously introducing solid sodium hydride and a mixture of trimethylborate and tetrahydrofuran into a reactor at a temperature of about 65° C. to produce the reaction:

$$4NaH + 4B(OCH_3)_3 \rightarrow NaBH_4 + 3NaB(OCH_3)_4$$

continuously withdrawing from said reactor a slurry of $NaBH_4$ in a mixture of trimethyl borate and tetrahydrofuran in which the by-product $NaB(OCH_3)_4$ is dissolved, filtering and recovering the $NaBH_4$, passing the filtrate into a column at the reflux temperature of tetrahydrofuran, maintaining said column at total reflux and passing $CO_2$ upwardly therethrough to produce the reaction: $NaB(OCH_3)_4 + CO_2 \rightarrow B(OCH_3)_3 + NaCH_3CO_3$, removing a slurry of $NaCH_3CO_3$ in trimethyl borate and tetrahydrofuran from said column, filtering off said $NaCH_3CO_3$, and adding make-up trimethylborate to the filtrate of trimethylborate and tetrahydrofuran and recycling the same to the sodium borohydride reactor.

7. A method according to claim 6 in which the trimethylborate and sodium hydride are introduced into the sodium borohydride reactor in a molar ratio of about 7.5 to 1.

8. A method according to claim 6 in which the sodium methyl carbonate is introduced into a reactor and mixed with a saturated aqueous solution of $Na_2CO_3$ at a temperature sufficiently high to evaporate the methanol which is produced upon hydrolysis of the $NaCH_3CO_3$, and recovering and recycling the methanol for further reaction to produce more trimethylborate.

No references cited.